US012659015B2

(12) United States Patent
Klatt

(10) Patent No.: US 12,659,015 B2
(45) Date of Patent: Jun. 16, 2026

(54) OPERATING AND/OR CONFIGURING A REPEATER DEVICE FOR ENABLING THE REPEATER DEVICE TO BE OPERATED TOGETHER WITH A USER EQUIPMENT

(71) Applicant: Deutsche Telekom AG, Bonn (DE)

(72) Inventor: Axel Klatt, Cologne (DE)

(73) Assignee: Deutsche Telekom AG, Bonn (DE)

( * ) Notice: Subject to any disclaimer, the term of this patent is extended or adjusted under 35 U.S.C. 154(b) by 387 days.

(21) Appl. No.: 18/568,861

(22) PCT Filed: Jun. 2, 2022

(86) PCT No.: PCT/EP2022/065089
§ 371 (c)(1),
(2) Date: Dec. 11, 2023

(87) PCT Pub. No.: WO2022/263195
PCT Pub. Date: Dec. 22, 2022

(65) Prior Publication Data
US 2024/0137106 A1    Apr. 25, 2024
US 2024/0235658 A9    Jul. 11, 2024

(30) Foreign Application Priority Data

Jun. 18, 2021    (EP) ..................................... 21180373

(51) Int. Cl.
H04B 7/155          (2006.01)
(52) U.S. Cl.
CPC ..... *H04B 7/15535* (2013.01); *H04B 7/15542* (2013.01)
(58) Field of Classification Search
None
See application file for complete search history.

(56) References Cited

U.S. PATENT DOCUMENTS 11,109,392 B2 *    8/2021    Qin ....................... H04L 5/0048
11,310,024 B2 *    4/2022    Krishnaswamy ........ H04B 1/44
(Continued)

FOREIGN PATENT DOCUMENTS

CN          109104232 A      12/2018

OTHER PUBLICATIONS

Deutsche Telekom: "Moderator's summary for email discussion [92-e-24-Repeaters]", 3GPP Draft; RP-211558, 3rd Generation Partnership Project (3GPP), Mobile Competence Centre; Jun. 2021 (Jun. 17, 2021), pp. 1-6, vol. TSG RAN, no. Electronic Meeting; Jun. 14, 2021-Jun. 18, 2021 17, 650, Route Des Lucioles ; F-06921 Sophia-Antipolis Cedex; France, XP052028004, Retrieved from the Internet: URL: https://ftp.3gpp.org/tsg_ran/TSG_RAN/TSGR_92e/ Docs/RP-211558.zip RP-211558.docx [retrieved on Jun. 17, 2021].
(Continued)

*Primary Examiner* — Brian S Roberts
(74) *Attorney, Agent, or Firm* — Leydig, Voit & Mayer, Ltd.

(57) ABSTRACT

A method for enabling a repeater device to be operated together with a user equipment includes: the repeater device is provided with or receives a piece of network identifier information of a telecommunications network; the repeater device receives, as part of a broadcast control channel transmitted by a base station entity, at least the network identifier information of the telecommunications network; and based on the repeater device determining that the received network identifier information of the telecommunications network corresponds to the piece of network identifier information, the repeater device receives and processes at least repeater-specific configuration information which is a part of control and/or configuration information of the broadcast control channel.

10 Claims, 1 Drawing Sheet

(56)                    References Cited

U.S. PATENT DOCUMENTS

| | | | |
|---|---|---|---|
| 2018/0098370 A1* | 4/2018 | Bangolae | .............. H04W 4/023 |
| 2020/0412519 A1 | 12/2020 | Krishnaswamy et al. | |
| 2021/0037445 A1 | 2/2021 | Abedini et al. | |
| 2021/0037457 A1 | 2/2021 | Li et al. | |
| 2021/0306065 A1* | 9/2021 | Abedini | ............. H04B 7/15528 |

OTHER PUBLICATIONS

Qualcomm: "NR Smart Repeaters for Rel-18", 3GPP Draft; RWS-210019, 3rd Generation Partnership Project (3GPP), Mobile Competence Centre; Jun. 7, 2021 (Jun. 7, 2021), pp. 1-14, vol. TSG RAN, no. Electronic Meeting; Jun. 28, 2021-Jul. 2, 2021, 650, Route Des Lucioles; F-06921 Sophia-Antipolis Cedex; France, XP052025586, Retrieved from the Internet: URL: https://ftp.3gpp.org/tsg_ran/TSG_RAN/TSGR_AHs/2021_06_RAN_Rel18_WS/Docs/RWS-210019.zip RWS-210019Smart Repeaters QCOM.pdf [retrieved on Jun. 7, 2021].

* cited by examiner

OPERATING AND/OR CONFIGURING A REPEATER DEVICE FOR ENABLING THE REPEATER DEVICE TO BE OPERATED TOGETHER WITH A USER EQUIPMENT

CROSS-REFERENCE TO PRIOR APPLICATIONS

This application is a U.S. National Phase application under 35 U.S.C. § 371 of International Application No. PCT/EP2022/065089, filed on Jun. 2, 2022, and claims benefit to European Patent Application No. EP 21180373.9, filed on Jun. 18, 2021. The International Application was published in English on Dec. 22, 2022 as WO 2022/263195 A1 under PCT Article 21(2).

FIELD

The present invention relates inter alia to a method for operating and/or for configuring a repeater device for enabling the repeater device to be operated together with a user equipment as part of or with a telecommunications network, the user equipment being able to be connected to the telecommunications network, wherein the repeater device is configured, via a transceiver entity or functionality, such as to receive, as well as to transmit or to retransmit, at least a part of the radio frequency signals transmitted by a specific base station entity, wherein the radio frequency signals transmitted by the specific base station entity comprise a broadcast control channel used to transmit control and/or configuration information to be received by the user equipment when connected to the specific base station entity.

Additionally, the present invention relates to a repeater device or to a telecommunications network for operating and/or for configuring the repeater device for enabling the repeater device to be operated together with a user equipment as part of or with the telecommunications network, the user equipment being able to be connected to the telecommunications network, wherein the repeater device is configured, via a transceiver entity or functionality, such as to receive, as well as to transmit or to retransmit, at least a part of the radio frequency signals transmitted by a specific base station entity of the plurality of base station entities, wherein the radio frequency signals transmitted by the specific base station entity comprise a broadcast control channel used to transmit control and/or configuration information to be received by the user equipment when connected to the specific base station entity.

Furthermore, the present invention relates to a telecommunications network provided for being used with a repeater device.

Furthermore, the present invention relates to a program comprising a computer readable program code, and to a computer-readable medium for using a repeater device or a telecommunications network.

BACKGROUND

Repeater devices are conventionally known to be used in telecommunications networks, e.g. in order to provide opportunities to cover an insufficiently or uncovered area of the telecommunications network, as, for example, a cellular mobile network.

Typically, repeaters or repeater devices are network elements working on OSI layer 1 (Physical Layer)—according to the open systems interconnection model (OSI model)—and typically amplify a radio frequency signal, typically coming from a cellular network (or its associated radio access network entities or functionalities such as base station entities or the like) and transmit (or, rather, retransmit) the amplified radio frequency signal, sometimes by usage of a directed antenna on the same frequency as the received signal.

Conventionally, repeaters or repeater devices are available for many radio technologies (such as, e.g., the different mobile communication standards like GSM, UMTS, LTE, NR, 5G, and also for WiFi and others), but the recent deployment of 5G systems, often (also) operating in comparatively high or higher frequency bands (such as, e.g., the so-called C-band at around 3.5 GHz in FrequencyRange FR1) and (also) operating in the millimeter band (mmWave, i.e. especially at frequencies higher than 24 GHz in FrequencyRange FR2) places new requirements and additional interest on such repeater equipment as it is a natural phenomenon that with increased frequency the coverage is harder to achieve.

There is quite a number of reasons why such repeater devices should be configurable, both initially but also flexibly and easily reconfigurable, e.g. such as to be able to be operated in a manner to reduce (or avoid) the retransmission of any received radio frequency signals and/or to provide the possibility for bandwidth and transmission scheme changes which are inherent in the 5G standard.

SUMMARY

In an exemplary embodiment, the present invention provides a method for enabling a repeater device to be operated together with a user equipment. The method includes: the repeater device is provided with or receives a piece of network identifier information of a telecommunications network, wherein the telecommunications network comprises or is assigned to an access network, and wherein the repeater device is configured to transmit or retransmit radio frequency signals transmitted by a base station entity of a plurality of base station entities of the access network; the repeater device receives, as part of a broadcast control channel transmitted by the base station entity, at least the network identifier information of the telecommunications network; the repeater device determines whether the received network identifier information of the telecommunications network corresponds to the piece of network identifier information; and based on the repeater device determining that the received network identifier information of the telecommunications network corresponds to the piece of network identifier information, the repeater device receives and processes at least repeater-specific configuration information which is a part of control and/or configuration information of the broadcast control channel.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
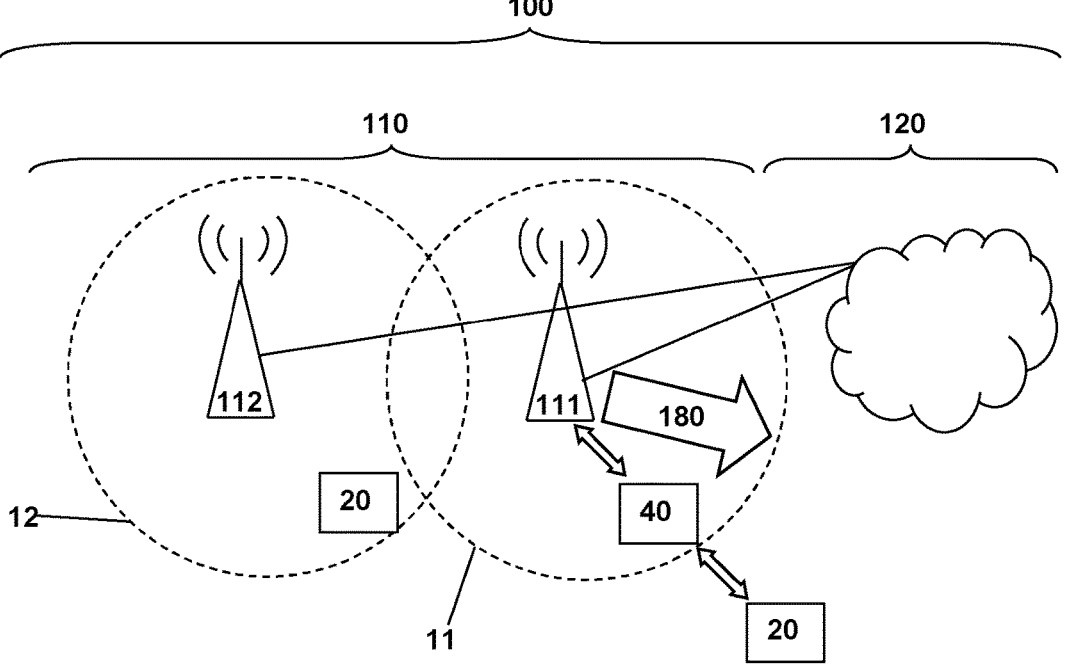
FIG. 1 schematically illustrates a mobile communication network comprising a multitude of radio cells being served by a multitude of base station entities, and user equipments being served by the mobile communication network, wherein one of the user equipments is served via a repeater device.

The present invention provides a method for operating and/or for configuring a repeater device for enabling the repeater device to be operated—especially together with a user equipment as part of or with a telecommunications network—such that its operation is able to be controlled or adapted via (a part of) the information content (control and/or configuration information) of the broadcast control channel used or broadcast by the (specific) base station entity transmitting the radio frequency signals that are (typically, or, at least, preferably only partly) retransmitted by the repeater device, resulting in the possibility to provide a control or a configuration of the (behavior of the) repeater device that is easy (especially from the point of view of an end user or subscriber of the telecommunications network), flexible and (if need be) quickly performed and realized.

Exemplary embodiments of the present invention provide a method for operating and/or for configuring a repeater device for enabling the repeater device to be operated together with a user equipment as part of or with a telecommunications network, the user equipment being able to be connected to the telecommunications network, and the telecommunications network comprising or being assigned to an access network, the access network comprising a plurality of base station entities, the base station entity transmitting radio frequency signals in a coverage area, respectively, wherein the repeater device is configured, via a transceiver entity or functionality, such as to receive, as well as to transmit or to retransmit, at least a part of the radio frequency signals transmitted by a specific base station entity of the plurality of base station entities, wherein the radio frequency signals transmitted by the specific base station entity comprise a broadcast control channel used to transmit control and/or configuration information to be received by the user equipment when connected to the specific base station entity, wherein the repeater device is configured such as to receive, and to process, at least a part of the control and/or configuration information transmitted by the specific base station entity using the broadcast control channel, wherein, as part of the control and/or configuration information of the broadcast control channel, a network identifier information of the telecommunications network is transmitted, wherein, in order to operate and/or to configure the repeater device, the method comprises the following steps:

in a first step, the repeater device is provided with or receives a piece of network identifier information, in a second step, the repeater device receives, as part of the broadcast control channel transmitted by the specific base station entity, at least the network identifier information of the telecommunications network, determines whether this network identifier information corresponds to the piece of network identifier information, and, in the affirmative case, receives and processes at least a repeater-specific configuration information being a part of the control and/or configuration information of the broadcast control channel.

According to the present invention, it is thereby advantageously possible to easily, flexibly and, if necessary, quickly realize a configuration (or a change of the configuration) of the repeater device via only modifying the information content (i.e. the control and/or configuration information, typically only the part thereof being relevant for the repeater configuration) of the broadcast control channel that is broadcast by the specific base station entity. According to the present invention and regarding the broadcast control channel of the specific base station entity (or at least regarding the relevant parts thereof), the repeater device is able to 'read' or to 'understand' (i.e. to process) the information content of at least the repeater-specific parts of the control and/or configuration information of the broadcast control channel.

For example, it is thereby advantageously possible, according to the present invention, to reduce (or to avoid) the retransmission of radio frequency signals (able to be potentially received and retransmitted by the repeater device) as much as possible—both with regard to the frequency band (or the plurality of frequency bands) retransmitted (i.e. which frequencies are retransmitted at all) as well as with regard to the power or power level of this retransmission. This is beneficial not only because it typically requires less energy to retransmit only a narrower frequency band or to entirely avoid the retransmission of a frequency or frequency band and/or to retransmit with a lower power level. Additionally, there is less electromagnetic radiation emitted by the repeater device which is beneficial as well, and, finally, avoiding the retransmission of any avoidable frequency bands (or parts thereof) and/or reducing the power or power level of retransmissions furthermore also reduces interference problems potentially arising from or linked to the operation of such repeater devices.

Furthermore, it is advantageously possible, according to the present invention, to handle configuration problems or additional configuration requirements especially linked with or occurring when using certain frequency bands, such as the 5G C-band and mmW-band, where typically time division duplex (TDD) transmission (and reception) schemes are used as the transmission and the reception band do no differ in frequency (as in the frequency division duplex (FDD) case) but in time. According to the present invention, such additional configuration requirements are able to be handled easily, flexibly and quickly, allowing for bandwidth and transmission scheme changes that may be inherent in the used radio access technology, as it is the case, e.g., for the 5G standard.

Additionally, it is advantageously possible according to the present invention that the amplification bandwidth is able to be configured: For repeaters or repeater devices, the amplification bandwidth (i.e. regarding which part of the frequency spectrum an amplification of the received incoming radio frequency signal shall be applied to generate the retransmitted radio frequency signal) is one of the parameters to be configured. As the repeater device shall be universally usable, a universally applicable and simple solution for general repeaters is provided via the present invention; hence, the repeater device needs to be provided (as part of the repeater-specific configuration information being a part of the control and/or configuration information of the broadcast control channel) to configure the operating frequency (typically the center frequency of the amplification frequency band) and the operating bandwidth.

According to conventionally known repeater devices, such a configuration (regarding the operating frequency and the operating bandwidth of the repeater) is done either via a hardcoded pre-configuration with fixed parameters for a given repeater model (especially applied regarding comparatively cheap repeaters for private use), or via a software configuration via an operations and maintenance system (O&M system, especially applied regarding professional repeater equipment).

According to the present invention, it is advantageously possible to use or apply a method and repeater device according to exemplary embodiments of the present invention to realize an efficient repeater functionality also in 5G systems: As in a 5G system, typically only an indication of the initial channel bandwidth for the initial random access is provided or announced (but not the entire channel bandwidth is provided; e.g. a new radio (NR) cell may transmit an initial channel bandwidth of 5 MHz, but the operation channel bandwidth for the traffic channels (PDSCH/PUSCH) may, for example, correspond to 20 MHz or even 100 MHz), it is advantageously possible, according to the present invention, that the repeater device (via using the information content of the control and/or configuration information of the broadcast control channel, especially the repeater-specific configuration information) is informed about the operation channel bandwidth for the traffic channels to apply; hence, it is advantageously possible to apply an amplification just for the required frequency band, avoiding to apply the amplification for unused or irrelevant frequency portions. Thus, advantageously this bandwidth information is preferably provided as part of the control and/or configuration information of the broadcast control channel.

Furthermore, in case of multiple frequencies (i.e. operating frequencies that may be used between a specific base station entity and a user equipment) in the same area of an operator, the preferred operating frequency (and, hence, the frequency band the repeater device shall operate on) is able to be configured by the control and/or configuration information of the broadcast control channel, especially in the form of a system information block (SIB) of the cellular network, and especially as part of the repeater-specific configuration information.

Additionally, it is advantageously possible to configure, via the control and/or configuration information of the broadcast control channel, also the gain (or the amplification of the repeater device) needs to be controlled in order to avoid that the (typically especially randomly deployed) repeater devices create too much interference; especially a parameter with the allowed maximum gain or Tx power (transmission power) of the amplifier (as part of the repeater device) is preferably broadcast on the serving base station entity, e.g. a new radio (NR) radio cell.

Hence, according to the present invention, the repeater device is operated and/or configured such that an operation of the repeater device together with a user equipment is possible, i.e. typically the repeater device is located in the coverage area of the specific base station entity, but the user equipment is not (e.g. due to the radio propagation properties inside a house or building), however, the user equipment is located (relative to the repeater device) such as to be located in the radio coverage area of the repeater devices. In such a scenario, the user equipment is able to be connected to the radio access network (typically one of a plurality of base station entities) of the telecommunications network, via the repeater device. Such a base station entity (or specific base station entity) typically transmits radio frequency signals. The repeater device comprises a transceiver entity or functionality and is configured (or via the transceiver entity or functionality being configured accordingly) the repeater device is configured, such as to receive, as well as to transmit (or, rather, to retransmit), at least a part of the radio frequency signals transmitted by the specific base station entity.

As it is conventionally known in mobile communication networks, the radio frequency signals transmitted by the specific base station entity comprise a broadcast control channel used to transmit control and/or configuration information to be received by the user equipment when connected to the specific base station entity.

Via its operation, the repeater device receives and retransmits the radio frequency signals of the specific base station entity (or at least a part of these signals) in order to enable the user equipment to receive (via the repeater device), inter alia, the control and/or configuration information of the broadcast control channel of the specific base station entity. Hence the information content of the broadcast control channel is intended to be received by the user equipment, and is actually received by the user equipment upon the retransmission operation of the repeater device.

According to the present invention, also the repeater device is configured to receive, and to process, at least a part of the control and/or configuration information transmitted by the specific base station entity using the broadcast control channel. Hence, regarding some parts (or pieces of information) transmitted on the broadcast control channel (i.e. parts of the control and/or configuration information), the repeater device is the intended addressee (and not. or at least not primarily, the user equipment).

In practice, a repeater device shall be usable for many different situations, and also in different telecommunications networks or mobile communication networks. In case that many base station entities (of a plurality of telecommunications networks) are broadcasting a broadcast control channel comprising repeater-specific information, a specific repeater device needs to know which one of potentially a plurality of broadcast control channels, each comprising repeater-specific information, is to be used. According to the present invention, as part of the control and/or configuration information of the broadcast control channel, a network identifier information (of the telecommunications network) is transmitted by the base station entity. In a first step of a method according to an exemplary embodiment of the present invention, a piece of network identifier information is provided to (or received by) the repeater device in any imaginable manner, as a kind of configuration anchor of the repeater device. In a second step (upon operational activity of the repeater device), the repeater device receives (as part of the broadcast control channel transmitted by the specific base station entity) at least the network identifier information of the telecommunications network. At this point in time, the repeater device is able to determine whether this network identifier information corresponds to (or corresponds sufficiently to) the piece of network identifier information (that has been provided (or received) previously as the configuration anchor), and in the affirmative case, the repeater device receives and processes at least one repeater-specific configuration information being part of the control and/or configuration information of the broadcast control channel.

According to a preferred embodiment of the present invention, the broadcast control channel is or corresponds to a logical control channel, wherein especially the repeater-specific configuration information is or corresponds to a specific, especially repeater-specific, system information block (SIB) that is part of the broadcast control channel, wherein especially the radio frequency signals transmitted, respectively, by the plurality of base station entities are receivable, at least in principle, by the user equipment and/or by the repeater device when located in a coverage area, respectively, regarding each one of the plurality of base station entities.

Via using a logical control channel, it is advantageously possible according to the present invention to configure the repeater device comparatively easily and independently from the specific implementation or communication scheme used on the physical layer. Via the repeater-specific configuration information being or corresponding to a specific, especially repeater-specific, system information block (SIB) that is part of the broadcast control channel, it is easily and efficiently possible to add (and to modify) configuration information to be used by the repeater device.

According to a further preferred embodiment of the present invention, the network identifier information of the telecommunications network corresponds to or comprises the public land mobile network identifier information (PLMN identifier) or the cell global identifier (CGI) of the specific base station entity, and/or wherein the piece of network identifier information corresponds to or comprises the public land mobile network identifier information (PLMN identifier) of a targeted telecommunications network, especially of the telecommunications network, wherein especially, besides the piece of network identifier information, at least one further piece of network identifier information, especially relating to a different further telecommunications network and to a further broadcast control channel, is provided to or received by the repeater device, and the corresponding configurations, especially additionally, applied, at least temporarily.

Via the network identifier information corresponding to or comprising the public land mobile network identifier information (PLMN identifier) or the cell global identifier (CGI) of the specific base station entity, the telecommunications network is easily able to be identified; in case the CGI is used, even the radio cell used, i.e. the specific base station entity. Likewise, via the piece of network identifier information corresponding to or comprising the public land mobile network identifier information (PLMN identifier), the telecommunications network to which the repeater device shall adapt its configuration is easily able to be defined.

According to the present invention, one primary use case to be addressed relates to the use of the repeater device such as to improve the coverage regarding one user equipment (necessarily being related or associated to one single telecommunications network) or to a plurality of user equipments being related or associated to the same telecommunications network; in such a situation, the repeater device only needs to 'read' the broadcast control channel of the one telecommunications network (or of one (specific) base station entity, typically linked to one telecommunications network. However, this does not mean that other use cases of the repeater device shall be excluded; such other use cases, e.g., refer to situations where more than one user equipments (e.g. two user equipments) are related or associated to two or more telecommunications networks: In such a situation, instead of having the requirement of using two 'single network repeater devices', the repeater device may have—besides the piece of network identifier information as a configuration anchor regarding the first telecommunications network—a further piece of network identifier information as a configuration anchor regarding a further telecommunications network (that or whose base station entities broadcast a further control channel). Especially, such a multi-network functionality of the repeater device could be realized temporarily, e.g. in order for the repeater device being able to provide coverage (or enhance the coverage) also regarding the further telecommunications network for the time of visiting friends (using the further telecommunications network with their user equipments) being present, e.g. in a house or flat or the like.

It is furthermore preferred according to the present invention that the repeater-specific configuration information comprises at least one piece of configuration information, especially regarding which part of the radio frequency signals—transmitted by the specific base station entity and potentially received by the repeater device—are to be, and according to which transmission parameters, retransmitted by the repeater device, especially towards the user equipment, the at least one piece of configuration information comprising one or a plurality out of the following:

an indication not to retransmit certain signals and/or not to retransmit on certain frequencies or in certain frequency bands, an indication, especially regarding filter adjustments, to retransmit on or regarding one or a plurality of frequencies or frequency bands, this indication especially indicating to retransmit exclusively on these frequencies or frequency bands, an indication, especially regarding amplifier adjustments, to retransmit using a specific transmission power or gain or using a specific transmission power level, this indication especially indicating to retransmit at most using this specific transmission power or gain or transmission power level, or indicating to retransmit at least using this specific transmission power or gain or transmission power level, an indication regarding transmission filter characteristics regarding the retransmission, an indication indicating a time division duplex uplink pattern and/or a time division duplex downlink pattern, an indication indicating a specific transmit antenna configuration or antenna pattern the repeater device should use to retransmit, an indication indicating a time during which the repeater device should operate to retransmit.

It is thereby advantageously possible to easily and efficiently configure—via the broadcast control channel of the specific base station entity, especially via an additionally defined repeater-specific system information block, "SIB X"—the repeater device.

It is furthermore preferred according to the present invention that the repeater device belongs to a predefined class of repeater devices, and wherein a further repeater device belongs to at least one further predefined class of repeater devices, wherein the broadcast control channel comprises, besides the repeater-specific configuration information, at least one further repeater-specific configuration information, and/or wherein the repeater-specific configuration information comprises at least one further piece of configuration information, wherein the at least one further repeater-specific configuration information and/or the at least one further piece of configuration information is or are directed to the at least one further predefined class of repeater devices, and especially indicate which part of the radio frequency signals—transmitted by the specific base station entity and potentially received by the further repeater device—are to be, and according to which transmission parameters, retransmitted by the further repeater device, especially towards the user equipment, the at least one further piece of configuration information comprising one or a plurality out of the following:

an indication not to retransmit certain signals and/or not to retransmit on certain frequencies or in certain frequency bands, an indication, especially regarding filter adjustments, to retransmit on or regarding one or a plurality of frequencies or frequency bands, this indication especially indicating to retransmit exclusively on these frequencies or frequency bands, an indication, especially regarding amplifier adjustments, to retransmit using a specific transmission power or gain or using a specific transmission power level, this indication especially indicating to retransmit at most using this specific transmission power or gain or transmission power level, or indicating to retransmit at least using this specific transmission power or gain or transmission power level, an indication regarding transmission filter characteristics regarding the retransmission, an indication indicating a time division duplex uplink pattern and/or a time division duplex downlink pattern, an indication indicating a specific transmit antenna configuration or antenna pattern the further repeater device should use to retransmit, an indication indicating a time during which the further repeater device should operate to retransmit.

It is thereby advantageously possible that more than one class (or category) of repeater devices are possible to be configured according to the present invention, i.e. the broadband control channel transfers more than one repeater configuration (or more than one set of (different) repeater configurations). This is able to be realized, e.g., via sub-SIBs (system information blocks) or, alternatively or cumulatively, via multiple SIBs. Hence, for example a plurality of different classes (such as, e.g., two, three, four, five or six different classes) of repeater devices are possible to be configured according to the present invention (via first and second, first, second and third, first to fourth, first to fifth or first to sixth repeater-specific configuration information and/or repeater-specific configuration information). Possible differences between these classes of repeater devices include, e.g., different bandwidths (e.g. a specific class of repeater devices could be configured to only amplify a part of a predefined bandwidth or the like) and/or different amplification levels (e.g. for indoor, outdoor, private or professional use).

According to still a further preferred embodiment of the present invention, in a third step, after the repeater device having received and processed the repeater-specific configuration information, the repeater device configures its retransmission characteristics according to the content and/or indications of or comprised by the at least one piece of configuration information of the repeater-specific configuration information received from the specific base station entity.

Thereby, it is advantageously possible according to the present invention that the repeater device applies the configuration read from the broadcast control channel received from the specific base station entity.

According to a further preferred embodiment of the present invention, the repeater device comprises, besides the transceiver entity or functionality, a processing entity or functionality and/or a further communication interface, wherein especially the piece of network identifier information is transmitted to the repeater device using the further communication interface, wherein the further communication interface especially corresponds to one or a plurality out of the following:

a Bluetooth and/or Zigbee and/or NFC communication interface, a WiFi communication interface, a new radio (NR) sidelink communication interface.

It is thereby advantageously possible according to the present invention that the piece of network identifier information is able to be received by the repeater entity, i.e. provided to the repeater device, in a flexible and convenient manner. According to a use case of the repeater device according to the present invention, only the piece of network identifier information (and, additionally, perhaps further pieces of network identifier information regarding another telecommunications network) needs to be provided to the repeater device in any imaginable manner, especially using a wireless transmission using the further communication interface. However, it is also possible and preferred according to the present invention that the piece of network identifier information is preconfigured (e.g. by the vendor or manufacturer of the repeater device, in association with a network operator of the telecommunications network). According to another possibility, the repeater device is equipped with an input interface (and, especially, additionally a display) such that the user or customer is able to input the network identifier information (or choose among a plurality of pieces of network identifier information or available telecommunications networks, e.g. received or detected by the repeater device). Likewise, it is possible and preferred according to another embodiment of the present invention that, in order to input the piece of network identifier information or to choose the correct one of the telecommunications networks available (e.g. at the current location of the repeater device), a configuration session is established, e.g. via a Bluetooth connection, between the user equipment and the repeater device such that the user is able to choose the telecommunications network to be used by the repeater device (i.e. to choose the broadcast control channel to be read (or heard on) by the repeater device).

In case that only the piece of network identifier information is transmitted to the repeater device, it would at least require additional measures if an association (or assignment) of the repeater device and the user equipment (or the plurality of user equipments) is required; hence, from the point of view of the telecommunications network, the repeater device is not easily (individually) recognizable (and, hence, addressable, e.g. via the repeater-specific configuration information comprising configuration information for one repeater device specifically in an individualized manner).

According to another preferred embodiment of the present invention, the repeater device comprises a user equipment entity or functionality such as to be able to be connected and/or attached, via the specific base station entity, to the telecommunications network, and identified by the specific base station entity and/or by the telecommunications network, wherein especially the piece of network identifier information is transmitted as part of a universal integrated circuit card (UICC), wherein especially, the repeater device is able to be linked or assigned or associated, by the specific base station entity and/or by the telecommunications network, to the user equipment.

Thereby, it is advantageously possible according to the present invention that the repeater device is—as any typical user equipment connected or attached to the telecommunications network—individually known to the telecommunications network.

The present invention also relates to a repeater device or to a telecommunications network (especially a base station entity thereof) for operating and/or for configuring the repeater device for enabling the repeater device to be operated together with a user equipment as part of or with the telecommunications network, the user equipment being able to be connected to the telecommunications network, and the telecommunications network comprising or being assigned to an access network, the access network comprising a plurality of base station entities, the base station entity transmitting radio frequency signals in a coverage area, respectively, wherein the repeater device is configured, via a transceiver entity or functionality, such as to receive, as well as to transmit or to retransmit, at least a part of the radio frequency signals transmitted by a specific base station entity of the plurality of base station entities, wherein the radio frequency signals transmitted by the specific base station entity comprise a broadcast control channel used to transmit control and/or configuration information to be received by the user equipment when connected to the specific base station entity, wherein the repeater device is configured such as to receive, and to process, at least a part of the control and/or configuration information transmitted by the specific base station entity using the broadcast control channel, wherein, as part of the control and/or configuration information of the broadcast control channel, a network identifier information of the telecommunications network is transmitted, wherein, in order to operate and/or to configure the repeater device, the repeater device and/or the telecommunications network, especially the specific base station entity, being configured such that:

the repeater device is provided with or receives a piece of network identifier information, the repeater device receives, as part of the broadcast control channel transmitted by the specific base station entity, at least the network identifier information of the telecommunications network, determines whether this network identifier information corresponds to the piece of network identifier information, and, in the affirmative case, receives and processes at least a repeater-specific configuration information being a part of the control and/or configuration information of the broadcast control channel.

Thereby it is advantageously possible, that—also with respect to the repeater device or the telecommunications network—a well-configured operation of the repeater device is possible to be easily, flexibly and, if necessary, quickly realized via only modifying the information content (i.e. the control and/or configuration information, typically only the part thereof being relevant for the repeater configuration) of the broadcast control channel that is broadcast by the specific base station entity.

The present invention also relates to a telecommunications network or to a user equipment configured or provided to be used with a repeater device according to the present invention.

Thereby it is advantageously possible, that—also with respect to the telecommunications network or to the user equipment—a well-configured operation of the repeater device is possible to be easily, flexibly and, if necessary, quickly realized.

Furthermore, the present invention relates to a program comprising a computer readable program code which, when executed on a computer or on a network node of a telecommunications network or on a base station entity or on a repeater device, or in part on the network node of the telecommunications network and/or in part on the base station entity and/or in part on the repeater device, causes the computer or the network node of the telecommunications network or the base station entity or the repeater device to perform a method according to an exemplary embodiment of the present invention.

The present invention also relates to a computer-readable medium comprising instructions which when executed on a computer or on a network node of a telecommunications network or on a base station entity or on a repeater device, or in part on the network node of the telecommunications network and/or in part on the base station entity and/or in part on the repeater device, causes the computer or the network node of the telecommunications network or the base station entity or the repeater device to perform a method according to an exemplary embodiment of the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100 is schematically shown. In the example, the mobile communication network 100 comprises an access network 110 and a core network 120. The mobile communication network 100 is preferably a cellular telecommunications network comprising typically a plurality of network cells (or radio cells), wherein two radio cells are represented in FIG. 1 via reference signs 11 and 12: a first radio cell 11, and a second radio cell 12. The access network 110 comprises at least a first base station entity 111 serving the first radio cell 11, and a second base station entity 112, serving the second radio cell 12. Two user equipments 20 are schematically depicted in FIG. 1 as examples of user equipments in contact to or with (or served by) the telecommunications network 100. One of the user equipments 20 is connected to one of the base station entities 111, 112 directly, in the example shown to the second base station entity 112. The other of the user equipments 20 is connected to the other base station entity 111 via a repeater device 40, i.e. the base station entity 111 (in the context of the present invention also called the specific base station entity 111 as it is the one with which, exemplarily, the repeater device 40 operates) transmits radio frequency signals in its coverage area (as any of the other base station entities of the telecommunications network 100 as well), and the repeater device 40 comprises a transceiver entity or functionality 41 being configured such as to receive, as well as to transmit or, rather, to retransmit, at least a part of the radio frequency signals transmitted by a specific base station entity 111.

As is schematically represented in FIG. 1 via an arrow and reference sign 180, the radio frequency signals transmitted by the specific base station entity 111 comprise a broadcast control channel 180 used to transmit control and/or configuration information to be received by the user equipments in the coverage area (schematically represented via reference sign 11) of the specific base station entity 111, at least when such user equipments are connected to the specific base station entity 111. In the exemplary situation represented in FIG. 1, the user equipment 20 connected to specific base station entity 111 via the repeater device 40 is located outside of the coverage area 11 of the specific base station entity 111, and receives the radio frequency signals retransmitted by the repeater device 40 as if such radio frequency signals arrived or were received directly from the specific base station entity 111.

Figure 2:
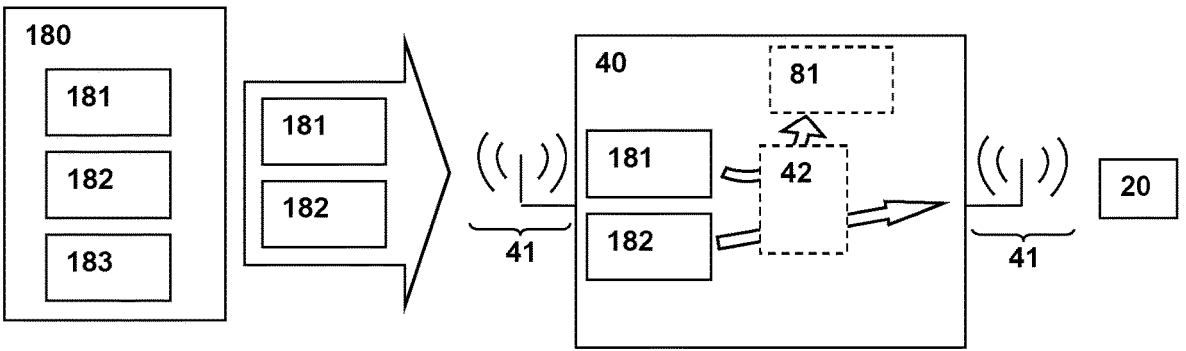
FIG. 2 schematically illustrates an exemplary representation of the transmission of configuration information towards the repeater device, namely the transmission of at least a part of the control and/or configuration information transmitted by the specific base station entity and using its broadcast control channel.

In order to be able—in operative use of the repeater device 40—to appropriately retransmit the radio frequency signals received from the specific base station entity 111, the repeater device 40 needs to be configured or needs to receive configuration information. According to the present invention, this is assured via the repeater device 40 being configured such as to receive, and to process, at least a part of the control and/or configuration information transmitted by the specific base station entity 111 using the broadcast control channel 180. This is schematically shown in FIG. 2 which shows an exemplary representation of the transmission of configuration information towards the repeater device 40, namely the transmission of at least a part of the control and/or configuration information transmitted by the specific base station entity 111 using its broadcast control channel 180. As part of the control and/or configuration information of the broadcast control channel 180, a network identifier information 181 of the telecommunications network 100 is transmitted to the repeater device 40. This network identifier information 181 (as part of the broadcast control channel 180 of the specific base station entity 111) is not only received by the repeater device 40 but also processed, i.e. read as to its information content, especially via the repeater device 40 comprising a processing entity or functionality 42.

It is assumed that the repeater device 40 comprises (e.g. upon manufacture or provided by the vendor of the repeater device 40) or is provided with or receives (especially using a further communication interface as part of the repeater device 40) a piece of network identifier information 81, schematically shown, in FIG. 2, as a dashed box. According to the present invention, the repeater device 40 checks whether the received network identifier information 181 (as part of the received broadcast control channel 180 from the specific base station entity 111) corresponds to the stored piece of network identifier information 81. If this is the case, the repeater device 40 both receives and processes (especially using the processing entity or functionality 42) at least a repeater-specific configuration information 182 being a part of the control and/or configuration information of the broadcast control channel 180 such as to be correctly configured, i.e. configured in accordance to the conditions, bandwidths used, transmission schemes (especially TDD) applied, of the specific base station entity 111.

Hence, according to the present invention, in a first step, the repeater device 40 is provided with or receives the piece of network identifier information 81, typically in the sense of a configuration anchor, and in the second step, the repeater device 40 receives, as part of the broadcast control channel 180 of the specific base station entity 111, at least the network identifier information 181 of the telecommunications network 100, determines whether this network identifier information 181 corresponds to the piece of network identifier information 81 (i.e. especially whether both pieces of information are indicating towards the same telecommunications network 100), and, in the affirmative case, receives and processes at least the repeater-specific configuration information 182 being a part of the control and/or configuration information of the broadcast control channel 180.

The representation of FIG. 2 is focused on schematically showing which information is used, according to the present invention, in order to configure the repeater device 40; FIG. 2 is not intended to represent the complete transmission of radio frequency signals between the specific base station entity 111, the repeater device 40, and the user equipment 20. Only as an example, FIG. 2 shows that the broadcast control channel 180 may comprise—and will comprise—, besides the repeater-specific configuration information 182 and the network identifier information 181 (used to configure the repeater device 40), additional control and/or configuration information which is schematically represented, in FIG. 2, via reference sign 183. This additional control and/or configuration information 183 is primarily intended to be transmitted to the user equipment 20, i.e. from the point of view of the repeater device 40 this part of the information content of the broadcast control channel 180 (along with, typically all or most of the user plane-related data transmission towards the user equipment 20, and from the user equipment 20 towards the specific base station entity 111) would rather not be required to be both received and processed (by the repeater device 40, especially its processing entity or functionality 42) but only received and retransmitted (i.e. handled by the transceiver entity or functionality 41, typically comprising both a receiver or receiver part, and a transmitter or transmitter part) as part of the radio frequency signals received from the specific base station entity 111 that are required—according to the repeater configuration as defined via the repeater-specific configuration information 182—to be retransmitted by the repeater device 40 towards the user equipment 20 (as well as, in the other direction, the radio frequency signals received from the user equipment 20 that are required—according to the repeater configuration as defined via the repeater-specific configuration information 182—to be retransmitted by the repeater device 40 towards the specific base station entity 111).

According to the present invention, the network identifier information 181 of the telecommunications network 100 especially corresponds to or comprises the public land mobile network identifier information (PLMN identifier) or the cell global identifier (CGI) of the specific base station entity 111. In case that latter applies, it is advantageously possible, according to the present invention, to differentiate (especially in case of differing broadcast control channels or a different information content thereof—with respect to information relevant to the repeater device 40) between different radio cells (or different base station entities) of the same telecommunications network 100 that may be almost equally well receivable to or by the repeater device 40.

According to the present invention, the repeater-specific configuration information 182 comprises at least one piece of configuration information, especially regarding which part of the radio frequency signals—transmitted by the specific base station entity 111 and potentially received by the repeater device 40—are to be, and according to which transmission parameters, retransmitted by the repeater device 40, especially towards the user equipment 20, the at least one piece of configuration information comprising one or a plurality out of the following:

an indication not to retransmit certain (or all) signals and/or not to retransmit on certain (or all) frequencies or in certain (or all) frequency bands (this may also include to ask (or to command) the repeater device 40 to be inactive or, at least, not to retransmit any radio frequency signals), an indication, especially regarding filter adjustments, to retransmit on or regarding one or a plurality of frequencies or frequency bands, this indication especially indicating to retransmit exclusively on these frequencies or frequency bands, an indication, especially regarding amplifier adjustments, to retransmit using a specific transmission power or gain or using a specific transmission power level, this indication especially indicating to retransmit at most using this specific transmission power or gain or transmission power level, or indicating to retransmit at least using this specific transmission power or gain or transmission power level, an indication regarding transmission filter characteristics regarding the retransmission, an indication indicating a time division duplex uplink pattern and/or a time division duplex downlink pattern, an indication indicating a specific transmit antenna configuration or antenna pattern the repeater device 40 should use to retransmit, an indication indicating a time during which the repeater device 40 should operate to retransmit.

Hence, the repeater configurations (or repeater-specific configuration information 182) are able to comprise, for example, an information that no repeater is to be used (on a specific frequency indication), a bandwidth of operation indication (filter adjustments), a gain control (e.g. the amplification in dB), the filter characteristics and/or the TDD uplink/downlink pattern.

Thus, according to the present invention, signaling is introduced to configure repeater devices 40, especially 5G repeaters (especially, but not necessarily, comparatively cheap repeaters as private equipment, used in end-user or small-office/home-office scenarios), in a customer friendly way under the control of the operator (of the telecommunications network 100). By doing this, dynamic changes to the repeater configuration are able to be applied, while full control is given to the operator to allow operation of repeater in its licensed spectrum.

In the following, an example of such a repeater-specific configuration information 182 is provided, e.g., in the form of a system information block "SIB X" as a pseudo RRC (radio resource control) signaling in ASN.1:

| SIBX: Carries configuration for a physical layer NR repeater |
| --- |
| SIBX ::= SEQUENCE { <br> repeaterAllowed BOOLEAN, <br> repeaterConfig SEQUENCE { <br> operatingFrequency ARFCN-ValueNR, <br> operatingBandwidth ..., <br> maxTxPower INTEGER (–xx..yy) OPTIONAL, <br> gainfactor INTEGER (A .. B) OPTIONAL, <br> tddConfiguration (...) OPTIONAL <br> } OPTIONAL, -- Need R <br> lateNonCriticalExtension OCTET STRING OPTIONAL, <br> ... <br> }. |

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enabling a repeater device to be operated together with a user equipment comprising:

the repeater device is provided with or receives a piece of network identifier information of a telecommunications network, wherein the telecommunications network comprises or is assigned to an access network, and wherein the repeater device is configured to transmit or retransmit radio frequency signals transmitted by a base station entity of a plurality of base station entities of the access network;

the repeater device receives, as part of a broadcast control channel transmitted by the base station entity, at least the network identifier information of the telecommunications network;

the repeater device determines whether the received network identifier information of the telecommunications network corresponds to the piece of network identifier information; and based on the repeater device determining that the received network identifier information of the telecommunications network corresponds to the piece of network identifier information, the repeater device receives and processes at least a-repeater-specific configuration information which is a part of control and/or configuration information of the broadcast control channel.

2. The method according to claim 1, wherein the broadcast control channel is or corresponds to a logical control channel, wherein the repeater-specific configuration information is or corresponds to a repeater-specific system information block (SIB) that is part of the broadcast control channel;

wherein radio frequency signals transmitted, respectively, by the plurality of base station entities are receivable by the user equipment and/or by the repeater device when located in a coverage area, respectively, regarding each one of the plurality of base station entities.

3. The method according to claim 1, wherein:

the network identifier information of the telecommunications network corresponds to or comprises a public land mobile network identifier information (PLMN identifier) or a cell global identifier (CGI) of the base station entity, and/or the piece of network identifier information corresponds to or comprises a public land mobile network identifier information (PLMN identifier) of the telecommunications network; and wherein, besides the piece of network identifier information, at least one further piece of network identifier information, relating to a different further telecommunications network and to a further broadcast control channel, is provided to or received by the repeater device, and corresponding configurations are applied at least temporarily.

4. The method according to claim 1, wherein the repeater-specific configuration information comprises at least one piece of configuration information, regarding which part of the radio frequency signals—transmitted by the base station entity and potentially received by the repeater device—are to be, and according to which transmission parameters, retransmitted by the repeater device, towards the user equipment, the at least one piece of configuration information comprising at least one of the following:

an indication not to retransmit certain signals and/or not to retransmit on certain frequencies or in certain frequency bands, an indication regarding filter adjustments, to retransmit exclusively on or regarding one or a plurality of frequencies or frequency bands, an indication regarding amplifier adjustments to retransmit using at most or at least a specific transmission power or transmission power level, an indication regarding transmission filter characteristics regarding a retransmission, an indication indicating a time division duplex uplink pattern and/or a time division duplex downlink pattern, an indication indicating a specific transmit antenna configuration or antenna pattern the repeater device should use to retransmit, or an indication indicating a time during which the repeater device should operate to retransmit.

5. The method according to claim 1, wherein the repeater device belongs to a predefined class of repeater devices, and wherein a further repeater device belongs to at least one further predefined class of repeater devices;

wherein the broadcast control channel comprises, besides the repeater-specific configuration information, further repeater-specific configuration information, and/or wherein the repeater-specific configuration information comprises at least one further piece of configuration information;

wherein the further repeater-specific configuration information and/or the at least one further piece of configuration information is or are directed to the at least one further predefined class of repeater devices, and indicate which part of the radio frequency signals—transmitted by the base station entity and potentially received by the further repeater device—are to be, and according to which transmission parameters, retransmitted by the further repeater device towards the user equipment, the at least one further piece of configuration information comprising at least one of the following:

an indication not to retransmit certain signals and/or not to retransmit on certain frequencies or in certain frequency bands, an indication regarding filter adjustments, to retransmit exclusively on or regarding one or a plurality of frequencies or frequency bands, an indication regarding amplifier adjustments to retransmit at most or at least using a specific transmission power or gain or transmission power level, an indication regarding transmission filter characteristics regarding a retransmission, an indication indicating a time division duplex uplink pattern and/or a time division duplex downlink pattern, an indication indicating a specific transmit antenna configuration or antenna pattern the further repeater device should use to retransmit, or an indication indicating a time during which the further repeater device should operate to retransmit.

6. The method according to claim 1, further comprising:

after the repeater device has received and processed the repeater-specific configuration information, the repeater device configures its retransmission characteristics according to content and/or indications of or comprised by the at least one piece of configuration information of the repeater-specific configuration information received from the base station entity.

7. The method according to claim 1, wherein the piece of network identifier information is transmitted to the repeater device using a communication interface, wherein the communication interface corresponds to at least one of the following:

a Bluetooth and/or Zigbee and/or near-field communication (NFC) communication interface, a WiFi communication interface, and/or a new radio (NR) sidelink communication interface.

8. The method according to claim 1, wherein the repeater device is configured to be connected and/or attached, via the base station entity, to the telecommunications network, and identified by the base station entity and/or by the telecommunications network;

wherein the piece of network identifier information is transmitted as part of a universal integrated circuit card (UICC); and wherein the repeater device is configured to be linked or assigned or associated, by the base station entity and/or by the telecommunications network to the user equipment.

9. A system, comprising:

a base station entity of a plurality of base station entities of an access network;

a user equipment; and a repeater device operable together with the user equipment;

wherein the repeater device is configured to be provided with or receive a piece of network identifier information of a telecommunications network, wherein the telecommunications network comprises or is assigned to the access network, and wherein the repeater device is configured to transmit or retransmit radio frequency signals transmitted by the base station entity;

wherein the repeater device is configured to receive, as part of a broadcast control channel transmitted by the base station entity, at least the network identifier information of the telecommunications network;

wherein the repeater device is configured to determine whether the received network identifier information of the telecommunications network corresponds to the piece of network identifier information; and wherein, based on the repeater device determining that the received network identifier information of the telecommunications network corresponds to the piece of network identifier information, the repeater device is configured to receive and process at least repeater-specific configuration information which is a part of control and/or configuration information of the broadcast control channel.

10. A non-transitory computer-readable medium having processor-executable instructions stored thereon for enabling a repeater device to be operated together with a user equipment, the processor-executable instructions, when executed, facilitating performance of the following:

the repeater device is provided with or receives a piece of network identifier information of a telecommunications network, wherein the telecommunications network comprises or is assigned to an access network, and wherein the repeater device is configured to transmit or retransmit radio frequency signals transmitted by a base station entity of a plurality of base station entities of the access network;

the repeater device receives, as part of a broadcast control channel transmitted by the base station entity, at least the network identifier information of the telecommunications network;

the repeater device determines whether the received network identifier information of the telecommunications network corresponds to the piece of network identifier information; and based on the repeater device determining that the received network identifier information of the telecommunications network corresponds to the piece of network identifier information, the repeater device receives and processes at least repeater-specific configuration information which is a part of control and/or configuration information of the broadcast control channel.

* * * * *